Jan. 16, 1923.
P. E. HOLT.
SINGLE SPRING YOKE ADJUSTER.
FILED SEPT. 3, 1919.
1,442,569
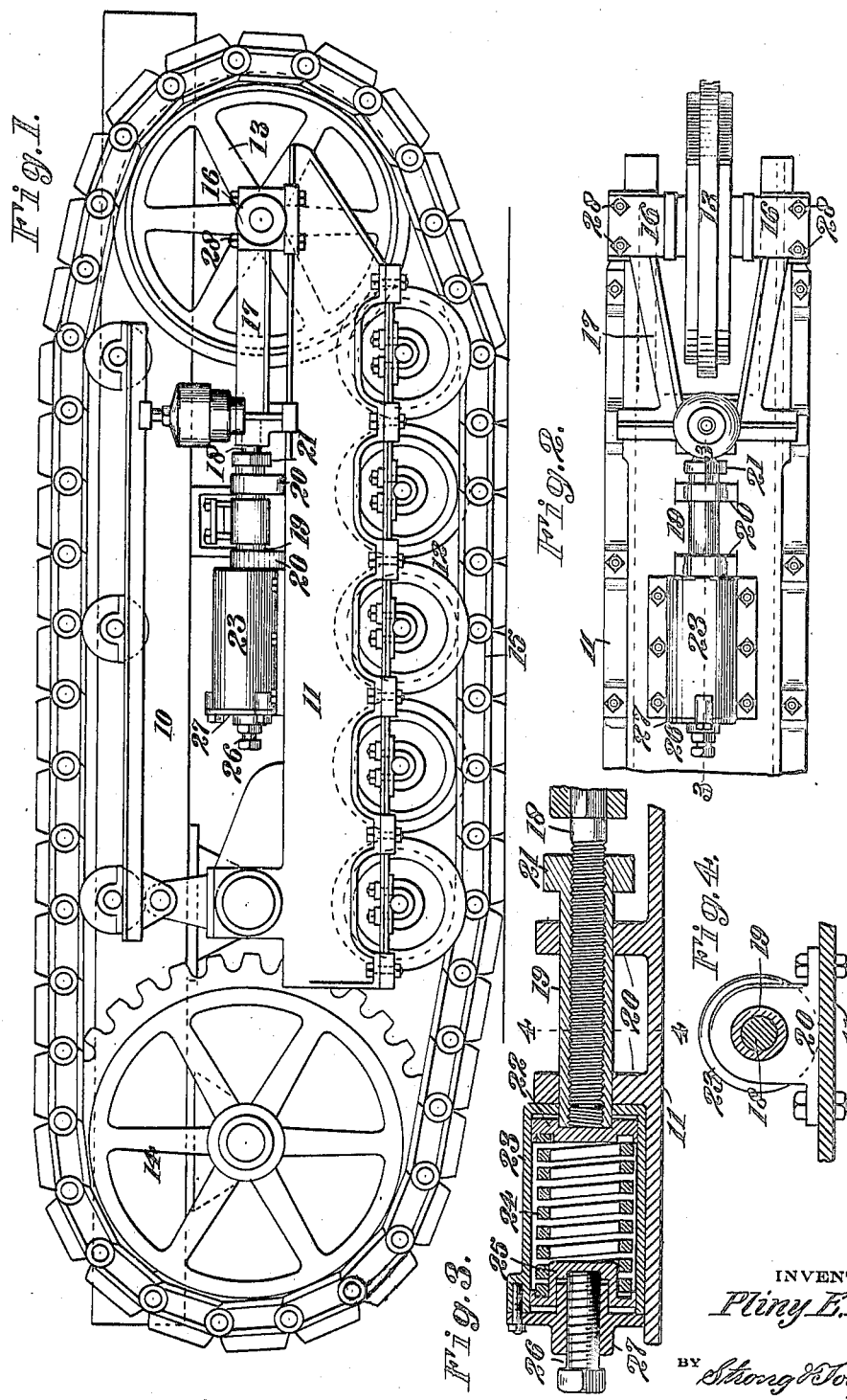
INVENTOR
Pliny E. Holt
BY Strong & Townsend
ATTORNEYS Patented Jan. 16, 1923.

1,442,569

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

SINGLE-SPRING YOKE ADJUSTER.

Application filed September 3, 1919. Serial No. 321,435.

*To all whom it may concern:*

Be it known that I, PLINY E. HOLT, a citizen of the United States, residing at Stockton, in the county of San Joaquin and State of California, have invented new and useful Improvements in Single-Spring Yoke Adjusters, of which the following is a specification.

This invention relates to tractors of the chain track type, and more particularly to spring means for assisting in adjusting the position of the idler sprocket wheel.

It has for its object to facilitate the adjustment of the idler wheel, whereby to maintain the chain track under proper tension to compensate for wear on the links. I accomplish this object by providing spring pressure means acting upon the front idler wheel in such a manner as to thrust said idler wheel forwardly for the purpose of taking up slack in the chain track.

Referring to the accompanying drawings:

Fig. 1 shows a side elevation of a tractor embodying my invention.

Fig. 2 shows a plan view of the forward portion of the truck mechanism.

Fig. 3 shows a sectional view, taken on the line 3—3 of Fig. 2.

Fig. 4 shows a detail sectional view, taken on the line 4—4 of Fig. 3.

A conventional type of tractor is illustrated herewith and comprises a main frame 10, at each side of which is a roller truck mechanism made up of a truck frame 11, upon which are journaled supporting rollers 12, and at the forward end of which is carried an idler sprocket wheel 13. The main frame is carried upon the truck mechanism in any suitable way, but preferably in a manner to permit rocking movement of the truck mechanism independently of the main frame. A driving sprocket wheel 14 is journaled upon the main frame near the rear end thereof and an endless chain track 15 passes around said driving sprocket wheel, beneath the rollers 12 and over the front idler wheel 13.

In tractors of this type it is usual to provide for taking up slack occurring in the chain track by adjusting the position of the front idler wheel; its bearing 16 being made slidable upon the truck frame for this purpose. Also in the usual type of construction a thrust yoke 17 is connected with the bearings 16 and extends rearwardly and is adjustably connected to the truck frame. This method of adjusting the position of the idler wheel requires considerable labor and the use of tools. To simplify this operation, I provide the mechanism about to be described.

At the rear end of the yoke 17 a spindle 18 is formed, which spindle is screw-threaded and carried in a sleeve 19, said sleeve 19 being rotatable in supports 20 fixed upon the truck frame and also having a hexagonal head 21 to permit the turning of the sleeve. The rear end of the sleeve 19 abuts against a disk 22 which is slidably received in a cylinder 23 fixed upon the truck frame. A spiral pressure spring 24 is carried within the cylinder 23 and compressed by means of a thrust member 25, which thrust member is adjustable by means of a screw-threaded bolt 26 carried in the head 27 of the cylinder.

In the operation of this device, when it is desired to adjust the tension of the track or to take up slack occurring therein, the spring 24 is compressed either by turning the screw-threaded sleeve 19 or the bolt 26. Thereafter the slidable bearings 16 are loosened from the truck frame by slacking the bolts 28, whereupon the idler sprocket wheel will be shoved forwardly a sufficient amount to take up the slack. In this way the labor and effort required to force the idler sprocket wheel forwardly against the weight and resistance of the heavy track 15 is reduced to a minimum.

Various changes in the construction and arrangement of the several parts herein shown and described may be employed without departing from the spirit of my invention as disclosed in the appended claims.

Having thus described my invention, what I claim and desire to secure by Letters Patent is—

1. In a tractor, the combination with an endless chain track, sprocket wheels for the track, a truck frame within the track, one of said sprocket wheels having its bearings slidably connected upon the truck frame, means for rigidly fastening said bearings in adjusted position, a thrust yoke extending rearwardly from said bearings and spring-pressed means between said thrust yoke and the truck frame for forcing said sprocket wheel in a direction to take up slack occurring in the track when the fastening means for the bearings is released.

2. In a tractor truck mechanism, the combination of an endless chain track, sprocket wheels for the track, one of said sprocket wheels having its bearings slidably mounted on the truck frame and adapted to be secured in place by fastening means, a thrust yoke connected with the slidable bearings, and pressure means acting upon the thrust member to move said sprocket wheel in a direction to tighten the track when the said slidable bearings have been slackened.

3. In a tractor truck mechanism, the combination of an endless chain track, sprocket wheels for the track, one of said sprocket wheels having its bearings slidably mounted on the truck frame and adapted to be secured in place by fastening means, a thrust yoke connected with the slidable bearings, pressure means acting upon the thrust member to move said sprocket wheel in a direction to tighten the track when the said slidable bearings have been slackened, said means comprising an extensible coil spring, and a screw-threaded connection between the coil spring and the thrust member, whereby to compress said spring.

In testimony whereof I have hereunto set my hand in the presence of two subscribing witnesses.

PLINY E. HOLT.

Witnesses:
CHARLES L. NEUMILLER,
DAVID B. LYMAN.